Sept. 22, 1942.  J. B. KUCERA  2,296,474
DEVICE FOR SPREADING FERTILIZER
Filed March 24, 1941  2 Sheets-Sheet 1
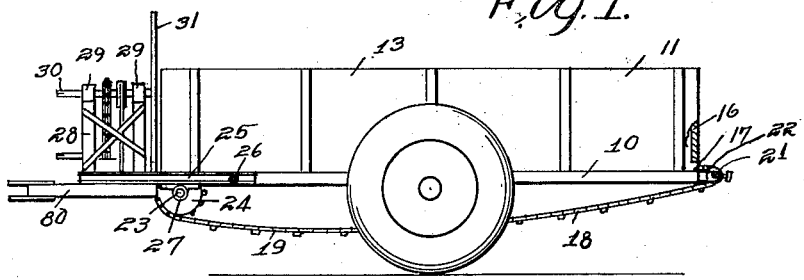
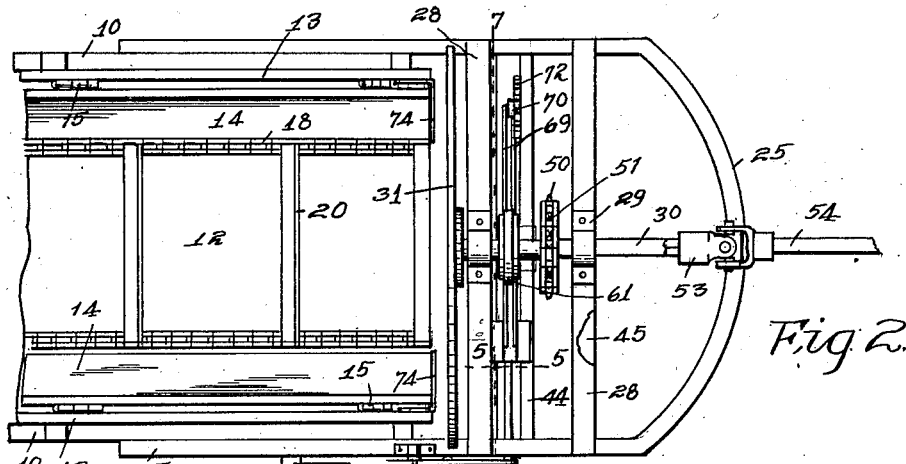
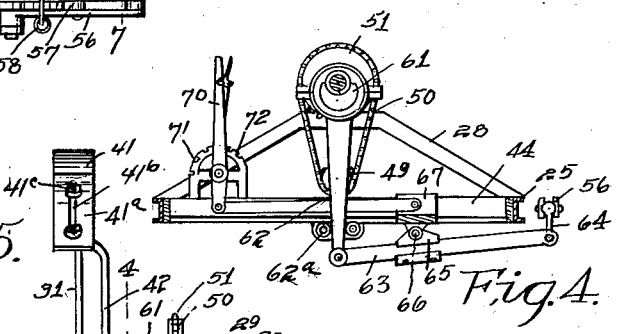
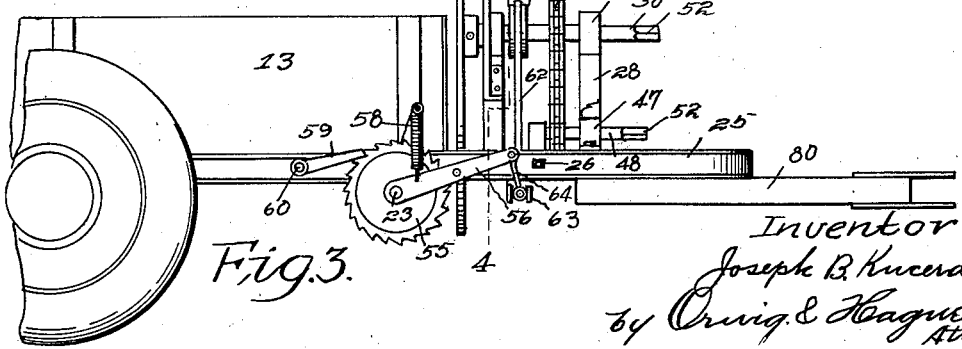
Inventor
Joseph B. Kucera
by Orwig & Hague
Attys Sept. 22, 1942.  J. B. KUCERA  2,296,474
DEVICE FOR SPREADING FERTILIZER
Filed March 24, 1941  2 Sheets-Sheet 2
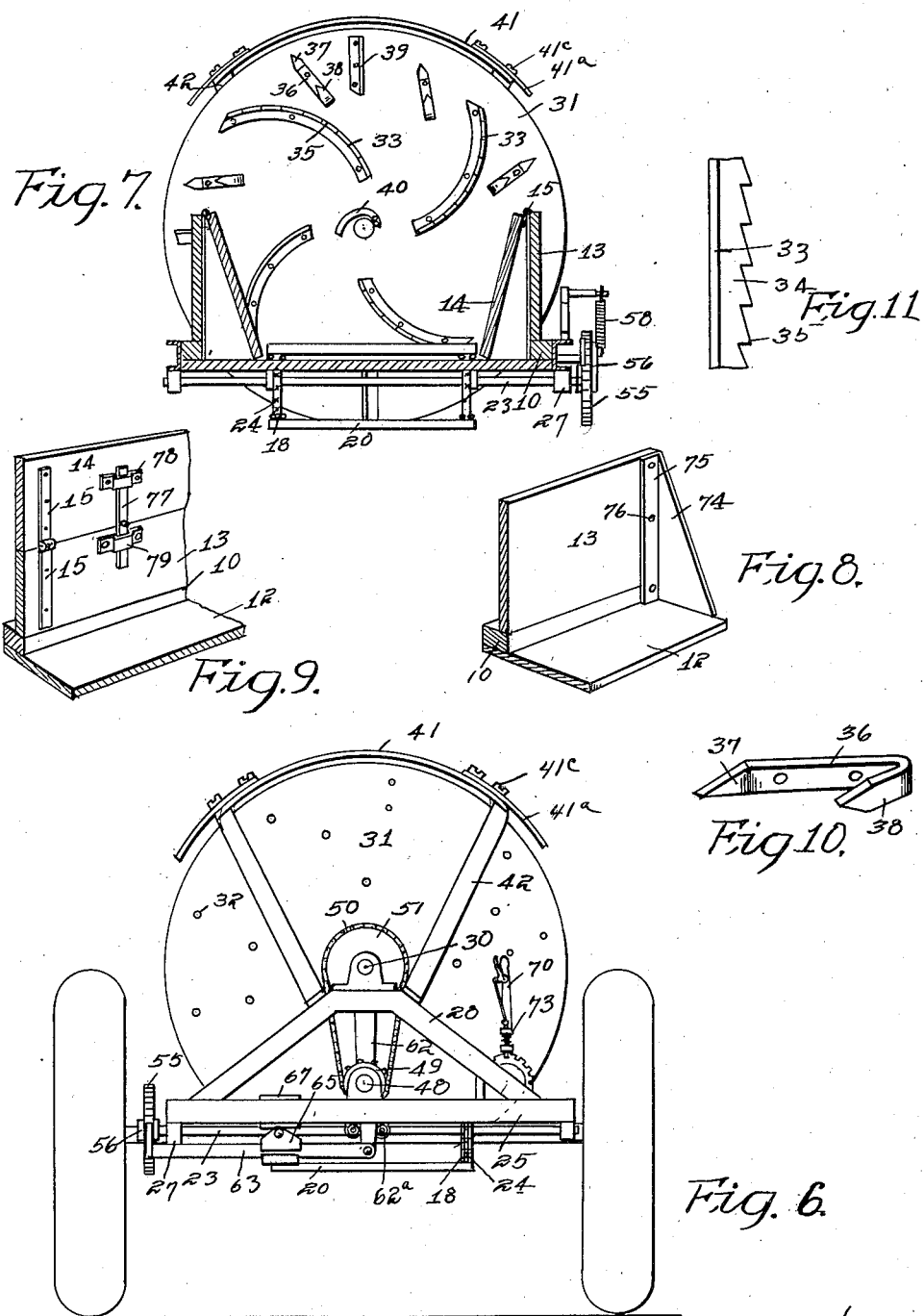

Patented Sept. 22, 1942

2,296,474

UNITED STATES PATENT OFFICE 2,296,474

DEVICE FOR SPREADING FERTILIZER

Joseph B. Kucera, Traer, Iowa

Application March 24, 1941, Serial No. 384,893

9 Claims. (Cl. 275—6)

The object of my invention is to provide a simple portable and inexpensive fertilizer distributor.

More specifically, it is the object of my invention to provide a fertilizer distributor in the form of a two-wheeled trailer which may be easily and quickly attached to a farm tractor, wherein power derived from the power take-off shaft of the tractor may be utilized for the operation of the spreader mechanism, including the spreading device and the means for feeding the material to the spreader.

A further object is to provide in a fertilizer distributor having a box so constructed and arranged that the box may be utilized for the purpose of hauling grain, such as corn, to an elevator, wherein the mechanism ordinarily used to convey the material within the box to the spreading element may be also utilized for delivering material to the dump receptacle of a grain elevator without disconnecting the trailer from the tractor.

A further object is to provide in a device of the class above described an improved spreading means wherein tough and entangled material may be separated and conveniently distributed over the ground surface.

A further object is to provide in a device of the type above described, improved means for feeding the material to the spreader element wherein the speed of the feeding mechanism may be easily and quickly varied by the simple operation of a hand lever, which may be accomplished while the machine is in operation, if so desired.

My invention consists in the construction, arrangement and combination of the various parts of the device, whereby the objects contemplated are attained, as hereinafter more fully set forth, pointed out in my claims, and illustrated in the accompanying drawings, in which:

Figure 1 is a side elevation of my improved distributor;

Figure 2 is a plan view of the front end of the distributor;

Figure 3 is a side elevation of the same;

Figure 4 is a detail sectional view taken on the line 4—4 of Figure 3;

Figure 5 is an enlarged detail sectional view taken on the line 5—5 of Figure 2;

Figure 6 is a front view of my improved distributor;

Figure 7 is a detail sectional view taken on the line 7—7 of Figure 2;

Figure 8 is a perspective view of a portion of the distributor box showing in perspective the plate for closing the end of the space;

Figure 9 is a detail perspective view of a portion of the box showing the manner in which a portion of the sides of the box is hinged to the lower portion, and the manner in which the said upper portion is locked to its upright position;

Figure 10 is a perspective view of one of the claws employed on the face of the distributor disc; and Figure 11 is a detail side elevation of another type of claw used on said disc.

My improved distributor comprises a frame 10 having a box 11 supported thereon, including a bottom 12 and side members 13, the upper edge of the side members 13 each being provided with what I shall term a sideboard 14 connected thereto by means of suitable hinges 15, the said sideboards 14 being hinged to swing downwardly and inwardly, with the free edges of said boards resting on the bottom 12 and of such width that they will assume a downwardly inclined position, as clearly illustrated in Figure 7, the said sideboards 14 being so folded when the device is used for the purpose of distributing fertilizer and adapted to be folded to an upright position, as illustrated in Figure 9 when the device is used for the purpose of transporting grain and other material from one point to another. When the device is used as a fertilizer distributor the front end of the box is left open, the back end of the box being closed by a suitable end gate 16, a space 17 being provided at the lower end of the end gate for permitting the top run of an endless conveyor 18 to pass therethrough. The said conveyor is of the type employing chains 19 and cross slats 20, the width of the conveyor being slightly less than the distance between the lower end of the members 14 when they are in their folded position.

The rear end of the frame 10 is provided with a shaft 21 supporting sprockets 22 for supporting the rear end of said conveyor while the forward end of the frame 10 is provided with a shaft 23 carrying sprocket wheels 24 which are fixed thereto, wherein material supported between the members 14 and on the bottom 12 may be moved forwardly by simply rotating the shaft 23 and the sprockets 24 in a clockwise direction, as illustrated in Figure 3.

The forward end of the frame member 10 is provided with an auxiliary frame 25, which is detachably secured to the said frame member 10 by means of bolts 26. The shaft 23 is mounted in bearings 27 fixed to the under surface of the frame member 25. The frame member 25 is provided with a pair of transversely arranged standards 28 having supported on their upper ends bearings 29 for rotatably supporting a shaft 30, said shaft being located at an elevation near the top of the side members 13 and in front of the end of the box 11. The rear end of the shaft 30 is provided with a disc 31, which I shall term for convenience a distributor disc, said disc 31 being preferably formed of metal and of a diameter substantially equal to, or a little greater than, the width of the box 11, so that the entire space at the forward end of the box between the members 14 is entirely covered or closed by said disc, one of the objects of the inclined members 14 being to utilize a somewhat smaller disc than would otherwise be possible if inclined side members were not provided. Furthermore, the box is comparatively large so as to accommodate a large quantity of light material, such as an ear of corn, while the fertilizers are comparatively heavy and the inclined sides 14 provide means for decreasing the size of the box when used as a fertilizer distributor.

The disc 31 is provided with a series of openings 32 for receiving bolts or rivets by means of which suitable claws may be secured to the back face of said disc to provide means whereby when the disc is rotated, material such as manure, having a considerable amount of straw, and other tough substances therein, may be loosened from the mass in small portions and torn apart and separated from said mass and discharged tangently from the disc as it is rapidly rotated, and caused to be thrown laterally from the distributor a considerable distance. The distance to which the material is thrown depends largely on the speed at which the disc is rotated.

In actual practice I find that several types of claws are desirable in order to accomplish the desired results satisfactorily. The numeral 33 indicates one type which is comparatively long and curved, having one end near the center of rotation and the other end extending rearwardly of its line of rotation and terminating near the periphery of the disc, the said member having a rearwardly extending flange 34 the free edge of which is provided with a series of teeth 35.

I have provided another form of claw 36 which consists of a strap of iron having pointed ends 37 and 38 inclined outwardly from the disc, said members 36 being inclined from their inner ends rearwardly relative to their line of rotation and supported near the periphery of the disc.

The third type of claw, 39, consists simply of a short section of angle iron secured to the outer edge of the disc in a radial manner, as clearly illustrated.

In order to prevent material from jamming at the center of the disc I have provided a spirally supported bar 40 which tends to move the material at the center of the disc outwardly towards the periphery, where it will be moved outwardly by centrifugal force into position where it will be engaged by the members 33. The disc as viewed in Figure 7 is designed to be operated in a clockwise direction.

To prevent the material from being thrown straight up in the air I have provided an arcuate shield 41 which is supported over the top portion of the disc by means of brackets 42 fixed to one of the upright members 28, each shield having an adjustable extension 41a provided with a slot 41b. Bolts or screws 41c are provided for adjusting said shields, when so desired.

The frame member 25 is provided with transversely arranged bars 43, 44 and 45, the bars 43 and 44 being supported comparatively close together, while the bar 45 is supported beneath the front one of the members 28, the bar 44 being provided with a bearing 46, while the bar 45 is provided with a bearing 47, a shaft 48 being rotatably mounted in said bearings 46 and 47 and provided with a sprocket 49 supporting a chain 50 which is mounted on a sprocket wheel 51 of larger diameter and fixed to the shaft 30. Thus, means is provided whereby if the shaft 48 is rotated, the shaft 30 will also be rotated at a slower speed, and with it the disc 31, the free ends of each of the shafts 30 and 48 being provided with a squared portion 52, either of which is adapted to receive a coupler element 53 of the power takeoff shaft 54, such as used in connection with the ordinary farm tractors, thus providing means whereby power may be applied to either of said shafts, and when applied to the shaft 52 the disc 31 will be rotated at comparatively high speed, while if the member 53 is applied to the shaft 30, the disc will be operated at a slow rate of speed.

For operating the feed conveyor 18 I have provided on the shaft 23 a ratchet wheel 55 which is fixed thereon, and a rock arm 56 consisting of two bars, one supported on each side of the said ratchet and pivotally mounted on the shaft 23, a pawl 57 being pivotally mounted to and between said bars, a spring 58 being provided for holding the free end of the rock arm upwardly. An idler pawl 59 is pivotally mounted on a shaft 60 secured in the frame member 25 adapted to engage the ratchet wheel 55 and to prevent reverse movement of the same.

Mounted on the shaft 30 I have provided an eccentric 61 having a downwardly extending eccentric rod 62, the lower end of which is slidably mounted between rollers 62a and pivotally connected to one end of a lever 63 arranged transversely between and below the bars 43 and 44, the other end of the lever 63 being provided with a link 64 which is pivotally connected to the free end of the rock arm 56, the rollers 62a serving to prevent only limited longitudinal movement of the lever 63.

Slidably mounted on the lever 63 is a shoe 65 supporting a fulcrum pin 66, said pin 66 being mounted in a carriage 67 slidably supported between and by the bars 43 and 44 (see Figure 5), the said carriage 67 having a pin 68 supporting one end of a pair of spaced links 69 supported horizontally between the bars 43 and 44 and having their other end pivotally connected to the lower end of a lever 70, which is pivotally mounted on a bracket 71 having a latch segment 72, the said lever 70 having a hand-actuated latch 73 of ordinary construction. By this arrangement it will be seen that if the lever 70 is oscillated, the carriage 67 will be moved longitudinally of the bars 43 and 44, carrying with it the shoe 65 which will be moved longitudinally of the lever 63 so that the ratio of the leverage length of the arms of the lever may be varied and thus provide means whereby when the shaft 30 is rotated and the rod 49 elevated, the outer end of the lever 63 will be moved downwardly, causing the rock arm 56 to also be moved downwardly, and in turn the ratchet 55 to be rotated in a clockwise direction, as viewed in Figure 3, and in turn the upper run of the conveyor 18 to be moved forwardly and the material supported thereon to be forced against the back face of the disc 31, the lever 70 providing means whereby the stroke of the rock arm 56 may be varied and the number of, ratchet teeth engaged by the pawl 57 also varied proportionately, so that the amount of material fed to the disc 31 may be varied at the will of the operator.

In order to prevent material discharged from the disc 31 from being delivered into the end of the space between the members 13 and 14 I have provided on the front end of each of the side members 13 a triangular shaped plate 74, said plate being secured thereto by means of a flange 75 and suitable bolts or rivets 76.

Thus, it will be seen I have provided a fertilizer distributor of comparatively simple construction, which is rigid, which is positive in its action, and which is capable of evenly distributing fertilizers, including tough, long, entangled material such as straw, weeds, etc., and also a distributor which is capable of distributing such material as pulverized limestone, the lever 70 and mechanism connected therewith providing means whereby the speed of the feed conveyor may be easily and quickly varied to meet the operative condition, to adapt it for the distribution of various kinds of fertilizers and also to the amount of the material distributed per acre.

The auxiliary frame 25 may, if so desired, be detached from the frame 10, carrying with it the distributing disc and all of the mechanism for operating the same, after, of course, the chain conveyor has been disconnected. The device would then have the form of a two wheeled trailer, in which case a suitable end gate would be provided for closing the front end. The sideboards 14 may then be moved to their upright position wherein the capacity of the body could be increased, said sideboards being locked in said elevated position by means of a slide bar 77 carried by said side members and slidably mounted in a bracket 78, the slide bar entering a bracket 79 carried by the members 13 when in said upright position.

The device may be utilized for hauling corn and other grains to the elevator by simply raising the sideboards 14 to their elevated positions and providing a suitable end gate for the front end and by removing the rock arm 56, the ratchet wheel 55 and the pawl 59 and again mounting them end to end for reversing their operative positions; it will be seen that the top run of the conveyor 18 may then be moved rearwardly and cause the material within the box to be discharged from its rear end to a suitable dump, the frame 25 being provided with a tongue 80 of ordinary construction, by means of which the device may be attached to a tractor.

I claim as my invention:

1. A fertilizer distributor, comprising a portable frame, a box carried by said frame, and open at one end, an endless conveyor in the bottom of said box, a single distributor disc mounted adjacent to and closing the open end of said box, means rotatably supporting said disc on said frame to rotate in a transverse plane, the rear face of said disc being provided with claws for engaging material fed to the face of said disc, means for rotating said disc, and means for actuating said conveyor to move material within said box toward and against said disc.

2. A fertilizer distributor, comprising a portable frame, a box carried thereon open at one end, an endless conveyor in the bottom of said box, a single distributing disc mounted adjacent to the open end of said box, said disc being of a diameter of substantially no less than the width of said box, means supporting said disc on said frame to rotate in a plane transversely of said box, with its axis of rotation near the top and center of said box, means for rotating said disc, and means for slowly advancing the conveyor to move material within said box toward and against said disc, the inner face of said disc being provided with claws whereby small portions of the material within the box will be torn loose and delivered tangentially as the disc is rotated.

3. A fertilizer distributor, comprising a portable frame, a box carried thereon open at one end, an endless conveyor in the bottom of said box, a single distributing disc mounted adjacent to the open end of said box, said disc being of a diameter of substantially no less than the width of said box, means supporting said disc on said frame to rotate in a plane transversely of said box, with its axis of rotation near the top and center of said box, means for rotating said disc, means for slowly advancing the conveyor to move material within said box toward and against said disc, the inner face of said disc being provided with claws whereby small portions of the material within the box will be torn loose and delivered tangentially as the disc is rotated, and means for varying the speed of said conveyor relative to the speed of said disc.

4. A fertilizer distributor, comprising a portable frame, a box carried thereon open at one end, an endless conveyor in the bottom of said box, a single distributing disc mounted adjacent to the open end of said box, said disc being of a diameter of substantially no less than the width of said box, means supporting said disc on said frame to rotate in a plane transversely of said box, with its axis of rotation near the top and center of said box, means for rotating said disc, means for slowly advancing the conveyor to move material within said box toward and against said disc, the inner face of said disc being provided with claws whereby small portions of the material within the box will be torn loose and delivered tangentially as the disc is rotated, means for varying the speed of said conveyor relative to the speed of said disc, and means for varying the speed of rotation of said disc.

5. A fertilizer distributor, comprising a portable frame, a box carried thereon open at one end, sideboards hinged to the upper edge of the sides of said box to swing from an upright position to a downwardly and inwardly inclined position within said box, an endless conveyor having its upper run supported on the bottom of said box and between the free edges of said sideboards, a single disc supported by said frame to rotate in a plane transversely of said box and adjacent to its open end, means for advancing said conveyor to move material supported within said box, toward and against said disc, means for rotating said disc at such a speed that it will tear loose portions of said material and deliver the same tangentially from said disc to spread the material evenly over the ground surface as the spreader is advanced.

6. A fertilizer distributor, comprising a frame, an axle supporting said frame at a point intermediate its ends, wheels supporting said axle, a pair of longitudinally supported shafts rotatably mounted in the forward end of said frame, a box carried by the rear end of said frame having its forward end open, a single distributor disc carried by the rear end of one of said shafts and supported adjacent to and closing the open end of said box, means operatively connecting said shafts to operate at different speeds whereby the speed of the conveyor may be varied relative to the speed of said disc, means for operatively connecting either of said shafts to the power take-off of a tractor, and means for feeding material within said box to and against the rear face of said disc.

7. A fertilizer distributor, comprising a portable frame, a box carried thereby having one end open, a spreader disc supported adjacent to the open end of said box, auxiliary sideboards hinged to the top edge of said box and inclined downwardly and inwardly from the top edge of said sides to the bottom of said box to receive material between them, means for feeding a mass of material supported between said inclined sides, to and against said disc, means for rotating said disc, and means closing the front ends of the sides between said inclined boards and the sides of said box, said auxiliary sideboards being adapted to swing from said downwardly and inwardly inclined position to an upright position in alignment with the sides of said box, and means for locking said auxiliary sideboards in said upright position.

8. A fertilizer distributor, comprising a frame, a box carried by said frame, a single axle supporting said frame at a point intermediate the ends of said box, wheels supporting said axle, shaft supports on the front end of said frame and ahead of said box, a longitudinal shaft supported by said shaft supports, a single spreader disc mounted on the rear end of said shaft substantially closing the forward end of said box, the rear face of said disc being provided with chains, means for feeding material within said box to and against said disc, means for attaching the forward end of said frame to a tractor, and means actuated by the power take-off of a tractor for rotating said shaft.

9. A fertilizer distributor, comprising a portable frame, a box carried by said frame, and open at one end, an endless conveyor in the bottom of said box, a single distributor disc mounted adjacent to and closing the open end of said box, means rotatably supporting said disc on said frame to rotate in a transverse plane, the rear face of said disc being provided with claws for engaging material fed to the face of said disc, means for rotating said disc, means for actuating said conveyor to move material within said box toward and against said disc, an adjustable arcuate guard over the top edge of said spreader disc, and means for adjusting the arcuate length of said guard.

JOSEPH B. KUCERA.